No. 609,030. Patented Aug. 16, 1898.
D. K. KELLER.
PIPE COUPLING.
(Application filed June 26, 1897.)
(No Model.) 2 Sheets—Sheet 1.

WITNESSES
K. Smith
A. Gosiger

INVENTOR
David K. Keller
her Wm. Hubbell Fisher
Atty.

No. 609,030.  
D. K. KELLER.  
PIPE COUPLING.  
(Application filed June 26, 1897.)  
Patented Aug. 16, 1898.

(No Model.)  
2 Sheets—Sheet 2.

WITNESSES  
Samuel A. West  
N. Smith

INVENTOR  
David K Keller

UNITED STATES PATENT OFFICE.

DAVID K. KELLER, OF MONTGOMERY, OHIO.

PIPE-COUPLING.

SPECIFICATION forming part of Letters Patent No. 609,030, dated August 16, 1898.

Application filed June 26, 1897. Serial No. 642,440. (No model.)

*To all whom it may concern:*

Be it known that I, DAVID K. KELLER, a citizen of the United States, and a resident of the town of Montgomery, in the county of Hamilton and State of Ohio, have invented certain new and useful Improvements in Pipe-Couplings, of which the following is a specification.

In many of the uses for which pipes are in the present times employed it is not necessary that they should be heavy nor that the material of which the tube or pipe is made should be thick through from the outside surface of the tube to the inside thereof. Hence for many purposes pipes or tubing is employed which is light and of a thin material. In a great many instances it becomes necessary to couple lengths of this pipe together, and it also often is necessary to provide couplings in order to separate certain portions of piping and again reunite them as desired.

My invention provides improved modes of strengthening these pipes at and near the couplings and also connects them with improved couplings in an improved manner.

Figure 2:
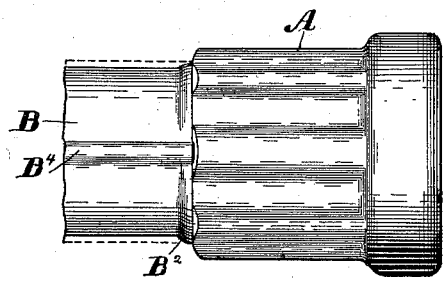
Figure 1:
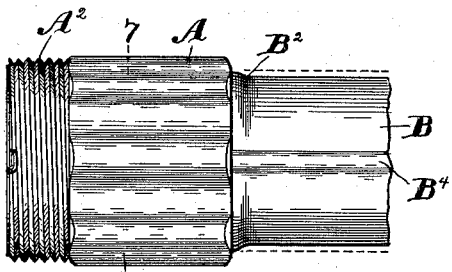
Figure 4:
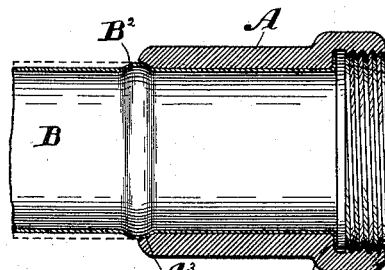
Figure 3:
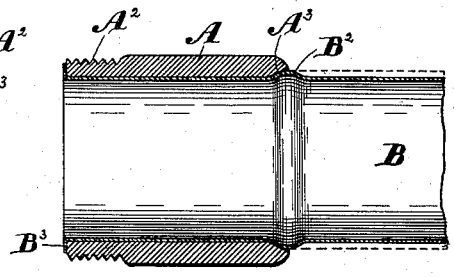
Figure 6:
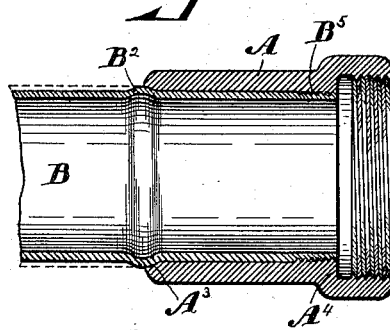
Figure 5:
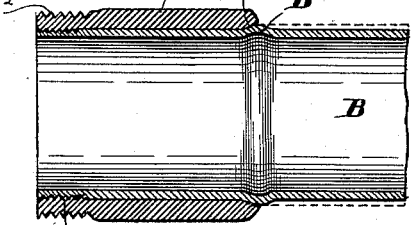
Figure 7:
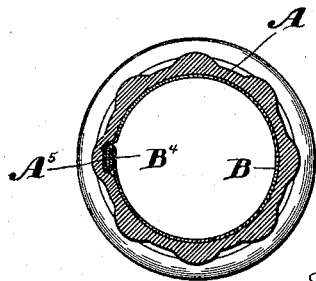
Figure 9:
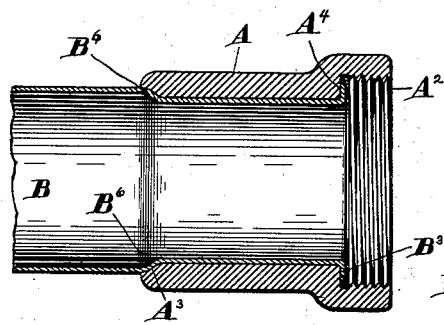
Figure 8:
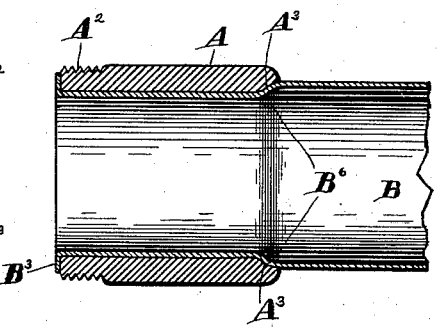
Figure 11:
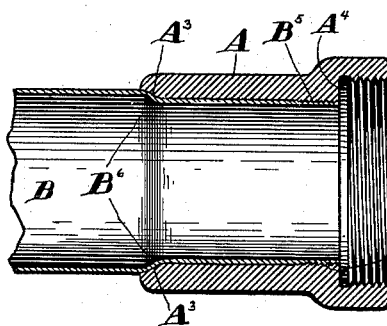
Figure 10:
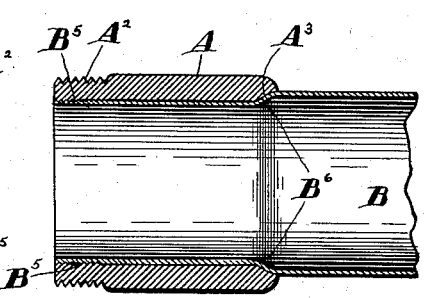

In the accompanying drawings, making a part of this specification, and in which similar letters of reference indicate corresponding parts, Figure 1 represents an outside elevation of a male coupling and pipe united according to my invention. Fig. 2 represents an outside elevation of a female coupling and pipe united according to my invention. Fig. 3 is a vertical central longitudinal section of the structure shown in Fig. 1. Fig. 4 is a similar section of the structure shown in Fig. 2. Fig. 5 is a vertical central section of the male coupling and a pipe united and illustrating a modification of my invention. Fig. 6 shows a vertical central section illustrating the application of the modification shown in Fig. 5 to the female coupling. Fig. 7 represents a vertical central section taken in the plane of the dotted line 7 7 of Fig. 1, that face of the section being seen which faces toward the right in Fig. 1, the front end of the female coupling being seen in the background. Fig. 8 is a vertical central section illustrating a modification of my invention. Fig. 9 is a vertical central section illustrating the application of a modification of the female coupling, the ends of the pipes being crimped to prevent their withdrawal from the couplings. Figs. 10 and 11 are vertical central sections, respectively, of the male and female couplings and their pipes, illustrating the same modification shown in Figs. 8 and 9, with the exception that the pipes are prevented from being withdrawn from the couplings by means of screw-threads upon their adjacent terminals.

A indicates the male coupling, consisting of a strong cylinder of metal of some thickness and having its exterior at and near one end provided with a screw-thread $A^2$. The other end of the coupling has a flare or bevel $A^3$ extending from within outwardly and across the end of the coupling, as shown. Thin pipe B may be and indeed is shown as employed. Upon the exterior of this pipe is formed a bead $B^2$, struck up from or spun upon the pipe. This bead is formed upon the pipe far enough back from the end—viz., a distance a little greater than the length of the coupling—in order to allow the pipe to overlap, as hereinafter mentioned.

The female coupling A and its pipe are similarly formed and combined, with the exception that it (the female coupling) has an enlarged mouth to admit the front end of the male coupling, and a screw-thread $A^2$, instead of being present on the exterior of the coupling, as in the male coupling, is present on the inner side of the mouth and engages the screw of the male coupling when the latter is screwed into it.

A shoulder $A^4$ is present at the rear of the screw-thread A to limit the entrance of the male coupling, and it is against and upon this shoulder that the free end of the pipe B is crimped.

Thin pipe, such as B, is usually constructed out of sheet metal by bringing the longitudinal edges of the metal together and folding them upon each other, so as to clamp the same firmly together. Thus a seam $B^4$ (see Fig. 7) is formed, and ordinarily this seam will project on the exterior of the tube and not on the inside. Accommodation for this seam is provided by the interior channel $A^5$ in the length of the coupling. This channel is present in both couplings as far as the pipe extends. In cases where it is undesirable to form the end crimp $B^3$ a screw-thread $B^5$ may be formed on outer side of the free end of the pipe and an interior screw-thread be formed on the coupling and these screw-threads made to engage each other. The pipe and coupling will then be held firmly together. In such a case the screw formed on the thin pipe B will be in the nature of a corrugation.

It is obvious that my invention is very simple in construction and economical of cost. The united parts form a strong and serviceable combination. In this way cheap light thin piping can be utilized in many ways where heretofore thicker piping was necessary.

The shoulder $B^2$ may be formed as a bead or be spun down, making the pipe inside the coupling of less diameter than that without, in which event the bead $B^2$ will be resolved into a shoulder $B^6$. Such construction is indicated by the dotted lines at the sides of the pipe in Figs. 1 to 6, inclusive, and more fully illustrated in Figs. 8 to 11, inclusive.

My invention is applicable for a large variety of purposes and uses. It is of value for pumps using a plunger or chain with buttons or disks, &c. When used for a chain, the diameter of the pipe throughout will be uniform, as shown in solid lines in the drawings.

The invention can also be used for certain parts of bicycles where lightness is required and for constructions in many other structures.

What I claim as new and of my invention, and desire to secure by Letters Patent, is—

1. The combination of a pipe-coupling having a bevel or flare on its rear inner end, and a pipe having a shoulder formed exteriorly on it, the coupling being passed upon said pipe, and its flare fitting upon said shoulder, and the forward portion of the said pipe being connected to the coupling so as to prevent the retraction of the pipe, from the coupling, substantially as and for the purpose specified.

2. The combination of a pipe-coupling, having a bevel or flare on its rear inner end, and a pipe whose end portion is within said coupling, and is provided with an exterior shoulder fitting within said flare, and whose forward end is crimped over an abutment on the forward portion of the coupling, substantially as and for the purpose specified.

3. The combination of a thin pipe having a shoulder, the pipe in front of the shoulder being spun or formed of less diameter than the remainder of the pipe, and a coupling having at its rear end a flare, and receiving the pipe within and the pipe-shoulder against the flare, and a means near or at the forward end of the pipe and coupling for preventing the separation of the pipe from the coupling, substantially as and for the purpose specified.

4. The combination of a coupling having a rear-edge flare and a longitudinal interior channel, and a thin seamed pipe whose forward end is within said coupling, and whose seam is received in said channel, and which pipe is provided with an exteriorly-raised inclined shoulder engaging with said flare, and means for enabling the pipe and coupling to hold firmly together and prevent the retraction of the pipe from the coupling, substantially as and for the purpose specified.

DAVID K. KELLER.

Attest:
WM. E. JONES,
A. GOSIGER.